United States Patent [19]

Westenberg

[11] Patent Number: 4,776,564

[45] Date of Patent: Oct. 11, 1988

[54] SLIDE VALVE

[76] Inventor: Martin Westenberg, Tramstrasse 29, 4132 Muttenz, Switzerland

[21] Appl. No.: 5,905

[22] Filed: Jan. 22, 1987

[30] Foreign Application Priority Data

Feb. 14, 1986 [DE] Fed. Rep. of Germany ....... 3604652
Feb. 26, 1986 [DE] Fed. Rep. of Germany ....... 3606236

[51] Int. Cl.⁴ ............................ F16K 3/16; F16K 3/20
[52] U.S. Cl. .................................... 251/172; 251/175; 251/193; 251/327; 251/328
[58] Field of Search ................ 137/240; 251/159, 172, 251/175, 193, 195, 196, 326, 327, 328, 329

[56] References Cited

U.S. PATENT DOCUMENTS

| 1,218,877 | 3/1917 | Long et al. | 251/327 |
| 1,411,608 | 4/1922 | Dawson | 251/327 |
| 1,868,147 | 7/1932 | Kruse | 251/172 |
| 3,088,705 | 5/1963 | Blackhall et al. | 251/327 |
| 3,110,470 | 11/1963 | Dumm | 251/172 |
| 3,185,436 | 5/1965 | Rovang et al. | 251/172 |
| 3,367,625 | 2/1968 | Fortune | 251/172 |
| 4,383,546 | 5/1983 | Walters, Jr. | 137/240 |
| 4,592,534 | 6/1985 | Ueda et al. | 251/327 |

FOREIGN PATENT DOCUMENTS

| 659093 | 10/1951 | United Kingdom | 251/328 |
| 770775 | 3/1957 | United Kingdom | 251/172 |

Primary Examiner—George L. Walton
Attorney, Agent, or Firm—Anthony J. Casella; Gerald E. Hespos

[57] ABSTRACT

The slide or gate valve (10) suitable in particular as pressure valve comprises a valve housing (12) in which a relatively wide and preferably double-walled closure body (14) is displaceable. The sealing of the closure body (14) within the valve housing (12) in the closed state is via a pressure-activatable seal (66). Downstream of the closure body (14) a tubular member (30) of increased diameter is disposed which serves as expansion member. The features of the very wide closure body, the pressure-activatable seal and the expansion member (30) make it possible to actuate the valve when pressure is in the conduits through which a gaseous or liquid medium charged with a high proportion of solid is conveyed.

17 Claims, 4 Drawing Sheets

SLIDE VALVE

The invention relates to a slide valve for a conduit for gaseous or liquid media with solid components, comprising a housing and a closure body bearing against a seal.

Such gate or slide valves are disposed in the course of pipelines or conduits through which for example solids such as cement or the like are pneumatically conveyed. The known gate or slide valves can only be actuated when no pressure is present in the conduit.

The invention is based on the problem of further developing a slide valve according to the preamble such that it can also be actuated under pressure, i.e. during the flow of the solids transported with a gaseous or liquid medium.

This problem is solved according to the invention in that the seal is constructed as seal which can be subjected to pressure and the closure body has a relatively large thickness and that downstream of the closure body an expansion member is disposed.

The slide valve according to the invention can be used as shutoff member for gaseous and liquid media charged with solid up to pressures of 10 bar. Even when the solid charges are high and with coarse-grain and abrasive solids the slide valve closes absolutely tightly. Since during actuation of the slide valve the seal is not subjected to pressure it is not exposed to any abrasion by the closure body and the valve as a whole is thus subjected to very little wear. Due to the relatively great thickness of the closure body the solid can be displaced better in the valve housing so that even larger grains do not get clamped. The expansion member disposed behind the closure body calms the flow of the material, thus likewise reducing the wear.

According to preferred embodiments the seal can be subjected to the action of a gaseous or liquid medium.

Preferably, the seal is constructed as encircling channel of open cross-section and is inserted in an annular groove in the valve housing. The annular groove is preferably undercut and the outer contour of the seal is dovetail shaped so that reliable retention of the seal in the annular groove is ensured. Preferably the seal is adhesively secured in the annular groove. The annular groove communicates with a pressure source via at least one through bore so that the seal after the closure body has reached the closure position can be inflated for example with air. When the closure body is to be brought into the open position the seal is evacuated so that it can withdraw into the annular groove again.

According to a preferred embodiment the closure body consists of two parallel plates with spacers disposed therebetween so that during the closure operation of the closure body the solids disposed in the region of the valve housing can be easily displaced.

If the slide valve is mechanically actuated, to one of the spacers of the closure body the piston rod of a piston-cylinder unit or a mechanical drive is preferably articulately connected.

The closure body consists preferably of metal or plastic with a rubber coating.

According to a preferred embodiment the expansion member consists of a tubular member or tube section of enlarged diameter, the end face of the tubular member facing the flow direction acting as engagement face for the closure body.

The valve housing preferably consists of metal with or without a rubber coating on the inside.

Examples of embodiment of the invention will be explained hereinafter in detail with the aid of the drawings, wherein.

Figure 1:
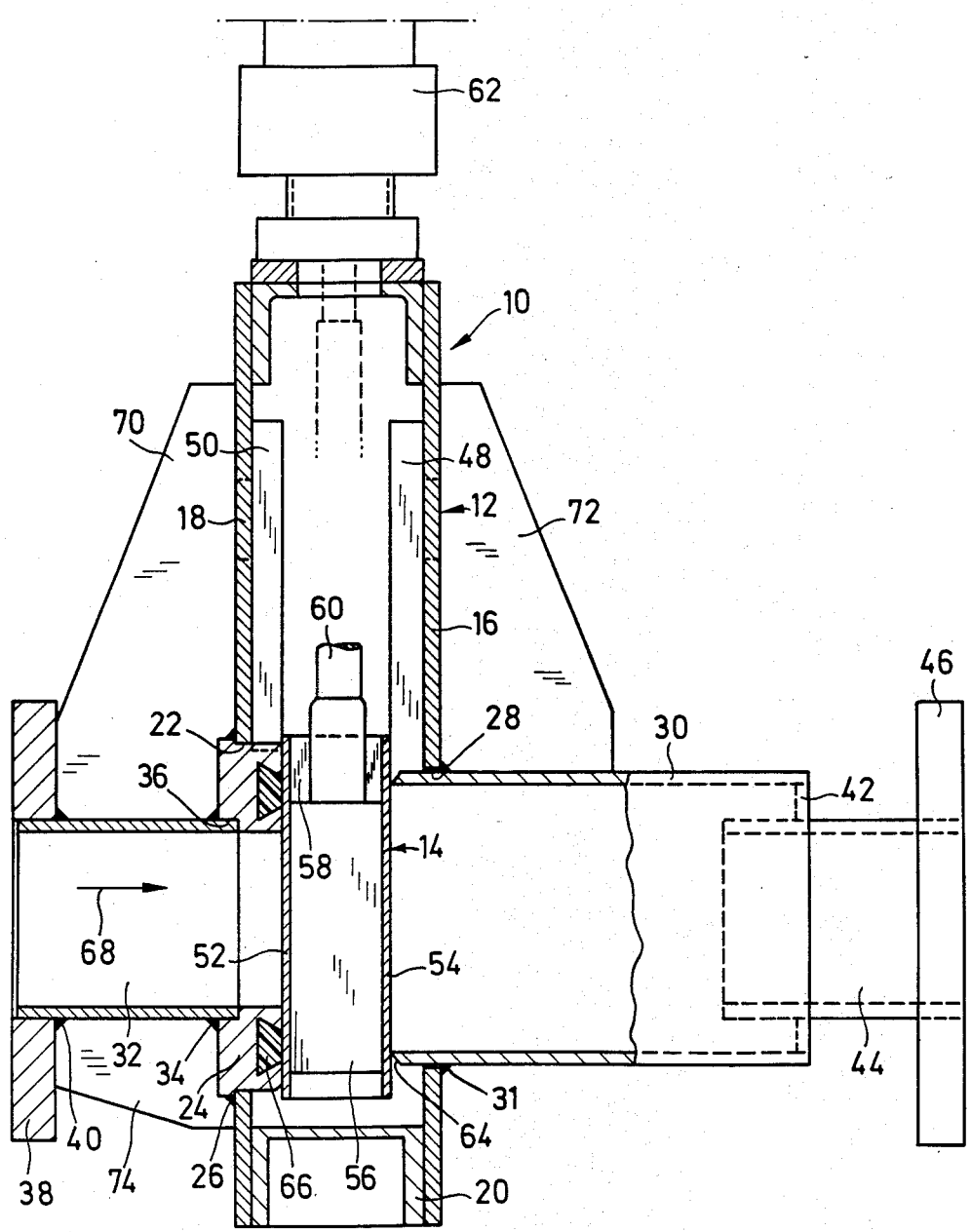
FIG. 1 shows an embodiment of a slide valve in longitudinal section.

FIG. 1 shows in longitudinal section a slide valve 10 which is disposed in the course of a pipeline or conduit which is not illustrated. Through the conduit gaseous or liquid media are transported containing a greater or lesser proportion of solids. The slide valve 10 comprises a valve housing 12 in which a closure body 14 is displaceable. The valve housing 12 consists of sheet metal plates 16 and 18 which are connected together via U-profiles 20 running round the edge. The sheet metal plate 18 is provided with a circular cutout 28 into which a tubular member 30 is secured via an encircling weld seam 32. Via a weld seam 34 a tubular member 32 is secured to the ring 24. For this purpose the ring 24 is formed with a recess 36. At the end opposite the ring 24 a flange 38 is welded to the tubular member 32 via a weld seam 40 and serves for connection to a pipe or conduit.

The tubular member 30 is provided at its end opposite the valve housing 12 with a ring 42 into which a tubular member 44 is inserted whose diameter corresponds to the diameter of the tubular member 32. The tubular member 44 projects with its end facing the valve housing 12 into the tubular member 30. Secured to the opposite end of the tubular member 44 is a flange 46 which serves for connection to an adjoining conduit. The diameter of the tubular member 30 is greater than that of the tubular member 32 or 44.

At the inside of the sheet metal plates 16 and 18 guide ribs 48 and 50 are disposed which serve to guide the closure body 14. The closure body 14, consisting of two parallel plates 52 and 54 with spacers 56 and 58 disposed therebetween, is articulately connected to a rod 60 which is actuated via a hydraulic or pneumatic piston-cylinder unit 62. The outer side of the closure body plate 54 bears on the bevelled inner end face 64 of the tubular member 30. On the outer side of the opposite closure body plate 52, when the valve is closed, a seal 66 bears which is constructed as pressure-actuated annular seal. The flow direction of the liquid or gaseous medium containing the solid components is indicated by the arrow 68. FIG. 1 shows the slide valve in the closed state, i.e. tube section 32 in front of the closure body plate 52 the medium to be conveyed is dammed up whilst behind the closure body plate 54 in the tube sections 30 and 44 no pressure of the medium is present. To reinforce the connection between the valve housing 12 and the tube sections or tubular members 32 and 30 reinforcing ribs 70, 72, 74 are provided.

Figure 2:
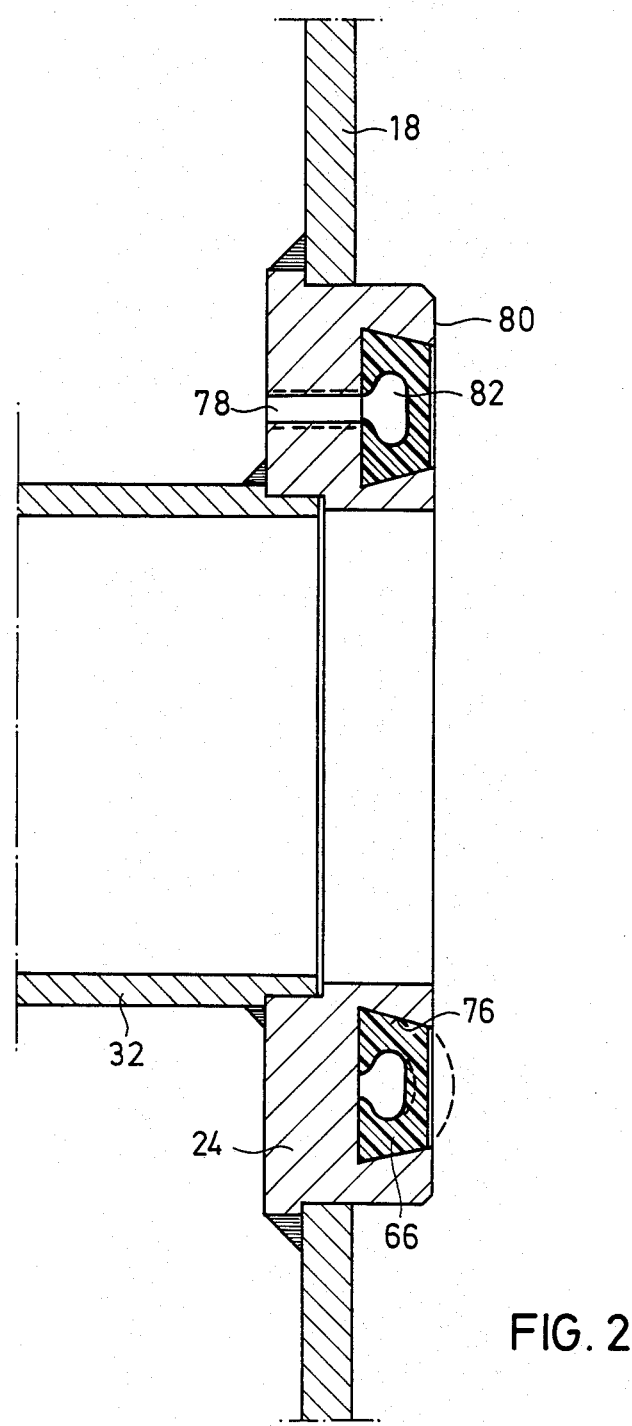
FIG. 2 shows to a larger scale the arrangement of a seal adapted to be subjected to pressure.

The construction and mode of operation of the pressure-actuable seal is shown in FIG. 2. The ring 24 in which the seal 66 is disposed is formed on the side opposite the closure body 14 with an undercut annular groove 76. Adhesively secured into the annular groove 76 is a rubber ring which is made as encircling channel open in cross-section and the outer contour of which is dovetail shaped. The outer contour of the seal 66 corresponds to the free cross-section of the annular groove 76. The annular groove 76 communicates via a through-bore 78 with a conduit, not shown, for a pressure medium. As pressure medium a liquid or preferably pressurized air may be used. In the unactivated state, i.e. when no pressure medium has been introduced through the bore 78 into the annular groove 76, the seal has a shape in which it does not project beyond the front side 80 of the ring 24. As soon as for example pressurized air is introduced into the annular groove 76 and thus into the cavity 82 of the seal 66 the latter expands and, since expansion is possible only beyond the side face 80, the seal assumes an outwardly curved shape as indicated in the lower part of FIG. 2. In this state the seal presses against the front side of the closure body plate 52 and as a result, supported by the pressure obtaining in the tube section 38, the closure body 14 pressure against the end face 64 of the tube section 30. The pressure-activated seal 66 ensures that a tight sealing is achieved of the conduit adjoining the tubular member 32 with respect to the conduit adjoining the tubular member 44.

Figure 3A:
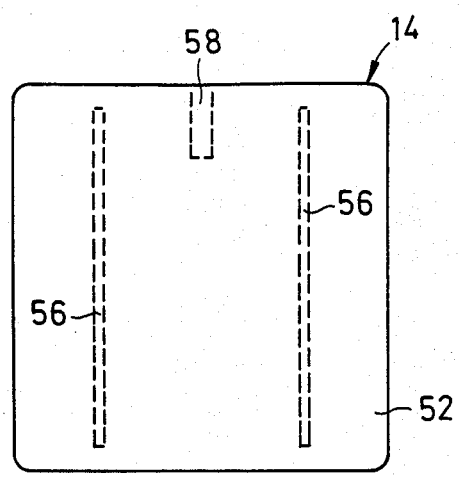
FIG. 3A shows a front elevational view of a closure body.
Figure 3C:
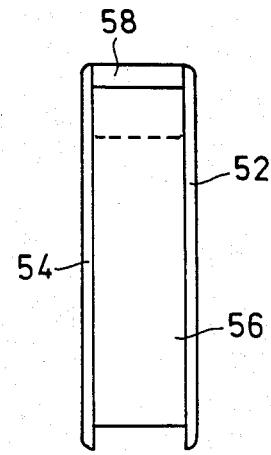
FIG. 3C shows a side elevational view of the closure body and FIG. 4 is a scheme illustrating a valve control.
Figure 3B:
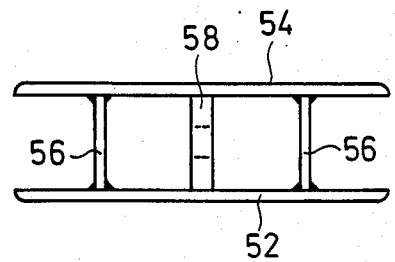
FIG. 3B shows a plan view of the closure body.

FIGS. 3A–3C show the closure body 14 in front elevation, plan elevation and side elevation. The two closure body plates 52 and 54 are spaced apart by the spacers 56 which are welded to the insides of the plates 52 and 54. Articulately connected to a spacer 58 additionally provided at the upper side is the piston rod of a pneumatic or hydraulic piston-cylinder unit or a spindle or the like so that the closure body 14 can be displaced within the valve housing 12. The outer sides of the closure body plates 52 and 54 in particular can be provided with a rubber coating so that the wear of the closure body is reduced. The double-walled form of the closure body 14 makes it possible to dispel better liquid collecting in the valve housing 12 so that even larger grains transported by the liquid or gaseous medium cannot be trapped when the closure body is moved within the valve housing 12 for closing or opening.

The tubular member 30 disposed downstream forms an expansion member in which the flow is calmed, thereby reducing the wear within the valve. To perform the function of an expansion member the diameter of the tube section 30 is greater than that of the tube section 32. To improve the wear properties preferably the interior of the valve housing is provided with a rubber coating.

Figure 4:
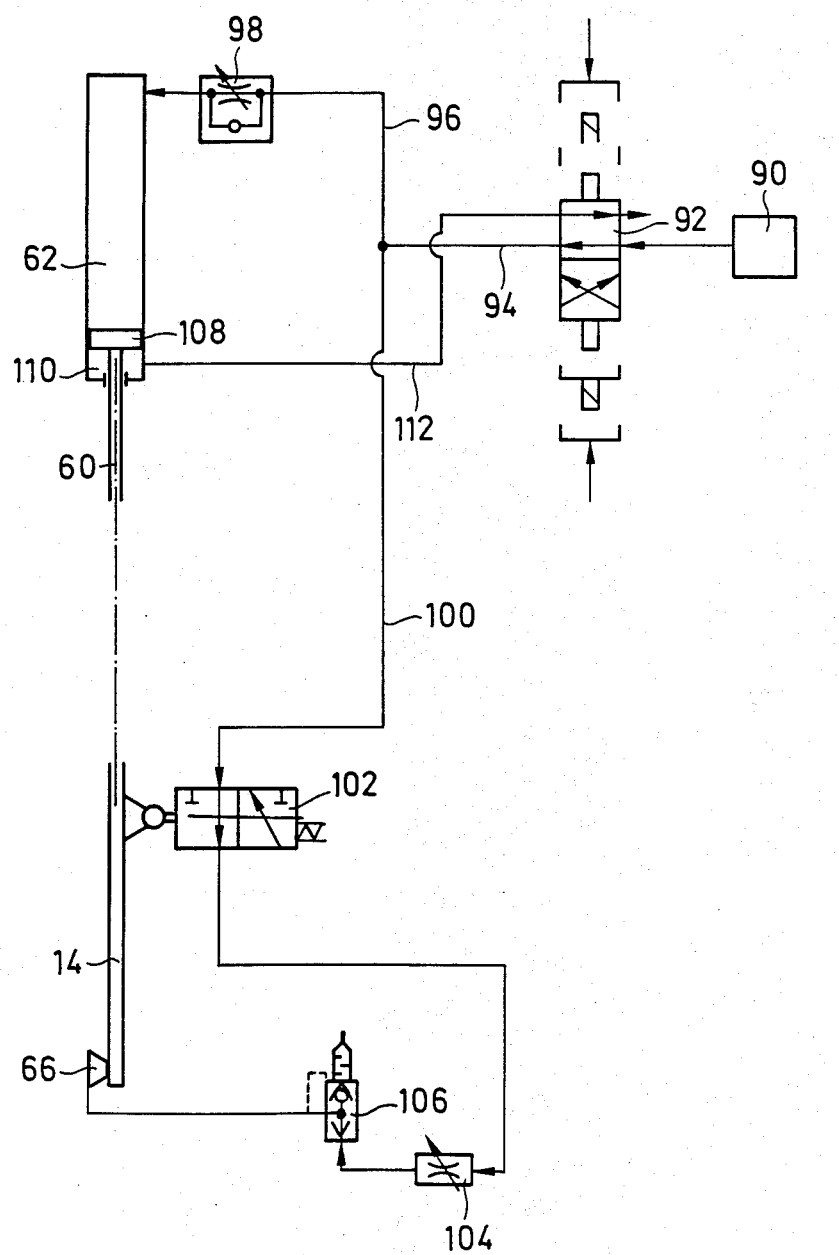

FIG. 4 shows schematically a pneumatic control of the pressure slide valve illusrated in FIGS. 1 to 3. From a compressed air source 90 via a 4/2 way valve 92, which may be manually, pneumatically or electrically actuated, compressed air is introduced into a conduit 94 and branches into a conduit 96 which leads via a throttle check valve 98 to the pneumatic piston-cylinder unit 62 and into a line 100 which via a 3/2 way valve 102, which is mechanically actuable, and via a throttle valve 104 leads to the pressure-activatable seal 66. Between the throttle valve 104 and the seal 66 a rapid-action vent valve 106 is provided via which on opening the closure body 14 the seal 66 is relieved. As soon as compressed air is introduced via the valve 92 the piston 108 of the piston-cylinder unit 62 is moved downwardly, the closure body 14 thereby being brought into the closure position. As soon as the closure body 14 has assumed its closure position compressed air is introduced via the valve 102 into the seal 66 so that the latter is inflated and bears sealingly on the side face of the closure body 14. During the displacement of the piston 108 into the closure position venting of the cylinder chamber 110 lying infront of the piston takes place via the line 112. To open the slide valve, via the line 112 by switching over the valve 92 compressed air is introduced into the cylinder chamber 110 so that the piston 180 can move upwardly and thereby entrain the closure body 14.

On initiation of the opening operation the conduit 94 is relieved from pressure and the cylinder chamber 110 pressurized. Through the built-in throttle valve 98 a certain pressure must first be built up before the piston 108 moves. This delay suffices to relieve the seal 66 via the rapid-action valve 106 so that on movement of the closure body 14 into the open position there is no friction at the seal 66.

I claim:

1. A slide valve apparatus for connection between an upstream conduit and a downstream coduit for gaseous or liquid media with solid components, comprising a housing and a closure body bearing against a seal, characterized in that the seal (66) is constructed as an encircling channel open in cross-section and is inserted in an annular groove at a location in the housing on the upstream side of the closure body, said seal being urged into a sealing engagement with said closure body by a control pressure and the closure body (14) has a relatively large thickness and comprises two parallel plates (52, 54) with spacers (56, 58) disposed therebetween, said spacers being aligned to define a cavity intermediate the plates and to permit the solid components to flow into the cavity, the flow of solid components into said cavity preventing the solid components from blocking the closure of the closure body, and that downstream of the closure body (14) an expansion member (30) is disposed, said expansion member defining a cross-sectional area greater than the cross-sectional areas of said upstream and downstream conduits respectively such that said expansion member reduces turbulent movement of the solid components and defines a buffer area for accumulation of the solid components to reduce wear on said expansion member and said downstream conduit caused by said turbulent movement of said solid components, said expansion member being disposed such that the pressure on the seal urge the closure body into sealing contact with said expansion member.

2. A slide valve according to claim 1, characterized in that said control pressure is a gaseous or liquid medium.

3. A slide valve according to claim 1 characterized in that the annular groove (76) is undercut and the outer contour of the seal (66) is dovetail in shape.

4. A slide valve according to claim 3 further comprising a pressure source in communication with said housing for directing a pressurized fluid thereto and wherein said housing further comprises or means for directing the pressurized fluid intermediate the seal and the housing such that a portion of said seal is urged out of the annular groove of said housing.

5. A slide valve according to claim 1 wherein the groove in said housing is of generally dovetail cross-sectional shape.

6. A slide valve according to claim 1 characterized in that the seal (66) is adhesively secured in the annular groove (76).

7. A slide valve according to claim 1 characterized in that the annular groove (76) communicates via a through-bore (78) with a pressure source (90).

8. A slide valve according to claim 1, characterized in that to one of the spacers (58) an actuating means is articulately connected.

9. A slide valve according to claim 8, characterized in that the closure body (14) comprises a rubber coating.

10. A slide valve according to claim 1 characterized in that the expansion member (30) comprises a tubular member of enlarged diameter.

11. A slide valve according to claim 10, characterized in that an end face (64) of the tubular member (30) is formed as engagement face for the closure body (14).

12. Slide valve according to claim 1 characterized in that the valve housing (12) comprises an internal rubber coating.

13. A slide valve according to claim 1 characterized in that the subjection of the seal (66) to pressure takes place after movement of the closure body (14) into the closure position and that prior to the movement of the closure body into the open position the seal (66) is relieved from pressure.

14. A slide valve according to claim 1 characterized in that the closure body comprises a metallic material.

15. A slide valve according to claim 1 characterized in that the closure body comprises a plastic material.

16. A slide valve according to claim 1 characterized in that the valve housing comprises a metal material.

17. A slide valve as in claim 1 wherein the parallel plates are aligned generally transverse to the flow of the gaseous or liquid media.

* * * * *